F. S. YOUNG.
PROCESS OF MANUFACTURING MAGNESIUM CARBONATE FROM MAGNESIAN LIMESTONE.
APPLICATION FILED OCT. 6, 1909.
1,101,772.
Patented June 30, 1914.
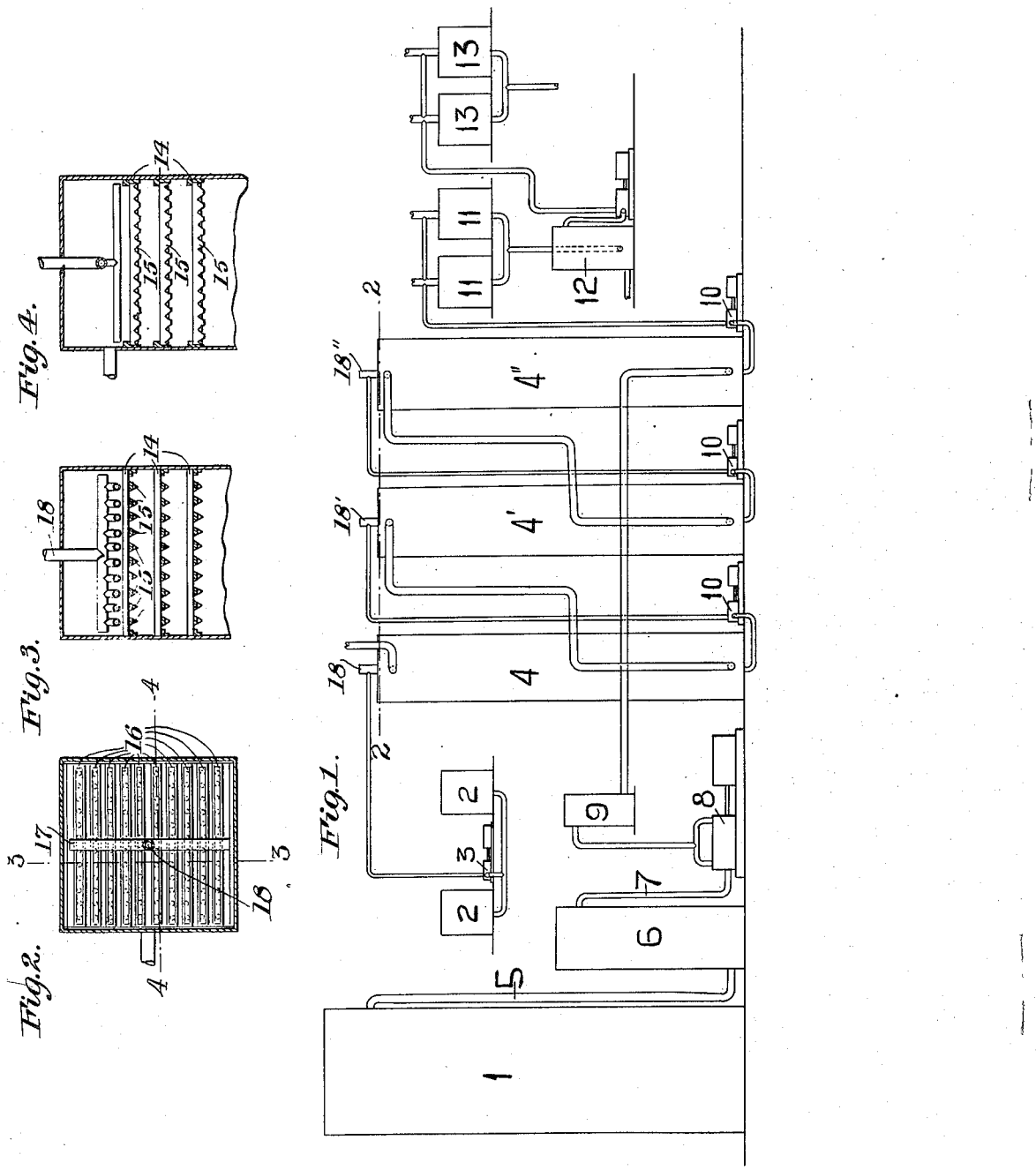

UNITED STATES PATENT OFFICE.

FRANK S. YOUNG, OF NEWARK, NEW JERSEY.

PROCESS OF MANUFACTURING MAGNESIUM CARBONATE FROM MAGNESIAN LIMESTONE.

1,101,772.   Specification of Letters Patent.   Patented June 30, 1914.

Application filed October 6, 1909. Serial No. 521,383.

*To all whom it may concern:*

Be it known that I, FRANK S. YOUNG, a citizen of the United States, and resident of Newark, in the county of Essex and State of New Jersey, have invented certain new and useful Improvements in Processes of Manufacturing Magnesium Carbonate from Magnesian Limestone, of which the following is a specification.

This invention relates to processes for manufacturing magnesium carbonate from magnesian limestones, and particularly to such processes in which the magnesium compound is separated from the calcium by dissolving the former in water impregnated with carbon dioxid.

It is an improvement on the invention disclosed and claimed in my Letters Patent 734030, dated July 21st, 1903, in which the carbonation of the magnesium and calcium hydrates in suspension in water, is performed at pressures equal to or approximating that of the atmosphere. In other words, the carbon-dioxid-containing gas, used for the carbonation, is contacted with the hydrates substantially uncompressed.

The object of my invention is the lowering of the cost of manufacture by eliminating a large part of the labor required in carrying out the old intermittent process, and by eliminating the expense of compressing the carbon dioxid bearing gas to the comparatively high pressures therein used.

In the process of manufacture at present employed, the dolomite or dolimitic limestone is first burned in suitable kilns to a quicklime. This quicklime is next slaked and mixed with the proper proportion of water. It is then charged into strong iron carbonating tanks. The gas from the calcination of the dolomite (which I will hereafter designate as kiln gas) is drawn from the kilns by a suitable compressor through an intermediate scrubber or cooler. The compressor compresses the gas to a pressure of 40-75 lb. per square inch in ordinary practice, after which it passes through a suitable cooler. The cooled gas is then led to the bottom of the first of the carbonating tanks, passes through the milk of lime therein, leaves the tank through a suitable connection at the top and discharges at the bottom of the next tank in series, passes to the next tank and so on through all the tanks that are being worked in the series. The carbon dioxid of the kiln gas combines with the calcium and magnesium hydrates of the milk of lime in the tanks forming the respective carbonates. In the case of the carbonate of magnesium this salt takes up an additional molecule of the carbon dioxid and forms, supposedly, a bicarbonate $MgH_2(CO_3)_2$. The existence of this salt has not been definitely proved in the solution and the existence of the magnesium in solution is sometimes explained as a simple solution of the carbonate in carbon-dioxid impregnated water. The formation of the hypothetical salt $MgH_2(CO_3)_2$, however, furnishes a convenient explanation of what takes place in the carbonation of the calcium and magnesium hydrates and I will therefore assume that the solution of the magnesium depends upon the formation of this salt. On this assumption, the reactions which take place in the carbonating tanks are (1) $Ca(OH)_2 + CO_2 = CaCO_3$
(2) $Mg(OH)_2 + CO_2 = MgCO_3$
(3) $MgCO_3 + H_2O + CO_2 = MgH_2(CO_3)_2$

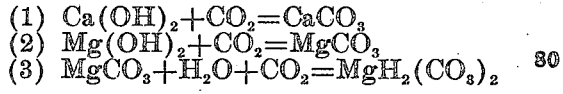

If the carbonation were carried far enough the calcium carbonate (in the presence of sufficient water) would also be converted into a soluble bicarbonate. It is the aim therefore to so conduct the carbonation that the gas is shut off from a tank at the point where the calcium just begins to go into solution.

The milky liquid containing the bulk of the magnesium in solution as a bicarbonate and the calcium in suspension as "precipitated chalk," is next filtered. The clear filtrate containing the magnesium in solution is next boiled. This operation is preferably performed by blowing live steam into the boiling tanks in contact with the entering stream of bicarbonate liquor. By thus heating the bicarbonate solution the bicarbonate is broken up, the larger part of the $CO_2$ being driven off while the magnesium precipitates as an insoluble basic carbonate. The temperature employed in boiling is usually about 205 to 212° Fah.

The temperature of boiling plays considerable part in determining the composition of the precipitate,—the higher the temperature the more basic the precipitate and the lower the proportion of the water of crystallization. The precipitated basic carbonate is separated from the mother liquor in which it is suspended by filtration, and dried.

It has been heretofore thought that, in order to secure magnesia solutions of workable strength, it was necessary to carbonate the calcium and magnesium hydrates under high pressures—from 65 to 75 lb. per square inch. Now I have discovered that carbonate solutions of magnesia of workable strength may be obtained by contacting the hydrates suspended in water (milk of lime) with the $CO_2$-bearing gas at atmospheric pressures. In present practice, the strength of the magnesia solution corresponds to 1.25 to 1.75% of basic carbonate. By my method I am easily able to obtain solutions carrying a quantity of magnesia corresponding to from 1.25 to 1.6% of basic carbonate.

In carrying out my process, I expose the hydrates suspended in water either in the form of a spray or rain or in a thin film to the action of the $CO_2$-bearing gas. I find that the suspended hydrates rapidly absorb the $CO_2$ to form calcium carbonate and magnesium bicarbonate as in the present method.

In the accompanying drawing I have shown one form of apparatus for applying my process.

Figure 1 is a diagrammatic side elevation of the apparatus; Fig. 2 is a cross-section of one of the carbonating towers on the line 2—2 of Fig. 1 showing a top-view of the arrangement for distributing the liquor; Fig. 3 is a partial vertical section of the tower on the line 3—3 of Fig. 2 showing the arrangement of the grids; Fig. 4 is a view similar to that of Fig. 3 but taken on the line 4—4 of Fig. 2 at right angles to the line 3—3, showing the grids in side elevation.

1 represents the lime kiln. The dolomite lime from the kiln, which chemically is a mixture of calcium and magnesium oxids, is slaked and mixed with an excess of water in the tanks 2, and is then pumped by the pump 3 to the top of the first of a series of carbonating towers or chambers 4, 4', etc. These carbonating towers may be built of light sheet iron supported on a suitable frame work. Devices of any suitable kind—such as layers of coarse broken dolomite supported on shelves—are provided in the interior of the towers for keeping the descending current of milk of lime broken up into a fine rain or spray which should be uniformly distributed over the cross-section of the tower. The form of filling employed may, if preferred, be a number of wooden grids superimposed upon each other, vertically suspended curtains of burlap or almost any of the well known arrangements used in gas scrubbing towers.

In the drawings I have shown partial sections through one form of carbonating tower; but, it is to be understood that I do not limit myself to carrying out my process by the use of carbonating apparatus of this construction. In this form of tower, the filling consists of a number of grids, 14, placed one above the other. The grids are composed of a number of spaced parallel slats, 15, preferably of triangular cross-section, with one face uppermost and horizontal. The lower edge of the slat is preferably serrated so that the liquid received by any slat will be properly distributed along the length of the slat and not tend to run along the bottom edge of the same to the walls. The mixture of hydrates and water may be distributed to the uppermost grid by means of a corresponding grid of perforated pipes, 16, of suitable size so set that a pipe is vertically over each slat of the grid. Pipes 16 are connected with a cross-pipe, 17, which is connected with one of the pipes 18, 18', etc., according to the tower in which the grid is situated. The milky liquid drips from grid to grid in a great number of fine streams, or as a rain, and thus exposes a large surface of contact with the current of gas flowing through the tower. The carbonic acid in the gas, is thus rapidly absorbed by the suspended hydrates, forming, firstly, carbonates and, secondly, bicarbonates if the exposure of the liquid to the action of carbonic acid is long enough continued. The milky liquid dripping from the lowermost grid collects in the bottom of the tower and is pumped by one of the pumps 10 to the next tower. Instead of using a tower, if preferred, the carbonation may be performed in apparatus similar to the rotary scrubbers employed in gas works. Any carbonating apparatus which suffices to reduce the milky liquid to a spray or rain or thin sheet and bring it into intimate contact with the kiln gas will answer the purpose of my process. The kiln gas is drawn off from the kiln through the pipe 5 and scrubber 6 to the suction pipe 7 of compressor 8. From 8 the kiln gas passes through the cooler 9 to the bottom of the last section of the carbonating apparatus. Passing through this it comes in contact with the most highly saturated milk. Any residue of undissolved magnesium carbonate is thus exposed to the action of the strongest gas. The gas next passes through the rest of the carbonating apparatus in the reverse direction to that followed by the circulation of the liquor. The weakest gas is thus contacted with the caustic hydrates of the fresh liquor. From the carbonating apparatus the milky liquid containing the magnesium carbonate in solution is pumped by a pump 10 to the filtering apparatus 11. This filtering apparatus is preferably of some continuous type, although filter-presses of the ordinary type will answer. In the filtering apparatus the undissolved constituents of the hydrates are separated from the magnesia solution, which latter next passes to the "boiler" 12. Here it is heated by steam to a temperature of 205°-210° F., and the basic carbonate of magnesium precipitated. The milky liquid next passes to the filtering apparatus 13 where the precipitate is recovered and after drying is ready for working.

Having described my invention what I claim is:—

1. The step in the manufacture of magnesium carbonate from magnesian limestone, which comprises, exposing a finely divided mixture of the calcined limestone and water to the action of a gas containing carbon dioxid, under a pressure not substantially above that of the atmosphere, to dissolve a major portion of the magnesia of said mixture in the water of the mixture.

2. The process of manufacturing magnesium carbonate, which comprises, calcining magnesian limestone to form a product which is capable of hydrating, slaking said product with water to convert oxids of calcium and magnesium into hydrates, suspending the so-formed hydrates in water to form a milky liquid, and contacting the said milky liquid, while in a fine state of subdivision, with uncompressed carbon dioxid bearing gas under a pressure approximately equal to that of the atmosphere to dissolve magnesia of said liquid and to precipitate the calcium of said liquid as carbonate.

3. The process of manufacturing basic magnesium carbonate, which comprises, calcining magnesian limestone to form a product containing free oxids of calcium and magnesium, slaking said material with water to convert said oxids into hydrates, suspending the so-hydrated material in a sufficient proportion of water to dissolve an amount of magnesium bicarbonate equivalent to the hydrated magnesia in said material, reducing the so-formed mixture of hydrated material and water to a fine state of subdivison, subjecting the finely subdivided mixture to the action of substantially uncompressed carbon-dioxid-bearing gas, derived from the calcination of said limestone, under a pressure approximately equal to that of the atmosphere to dissolve magnesia of said hydrated material to form a solution of bicarbonate and precipitate the calcium of said material as carbonate, separating said carbonate of calcium from said magnesium bicarbonate solution, heating the separated bicarbonate solution to precipitate the magnesia therefrom as basic carbonate, and recovering said basic carbonate.

Signed at New York, in the county of New York and State of New York, this 5th day of October A. D. 1909.

FRANK S. YOUNG.

Witnesses:
 Louis F. Musil,
 W. J. Quentin.